No. 825,354. PATENTED JULY 10, 1906.
P. J. A. SCHNOOR.
PIPE COUPLING.
APPLICATION FILED APR. 18, 1905.
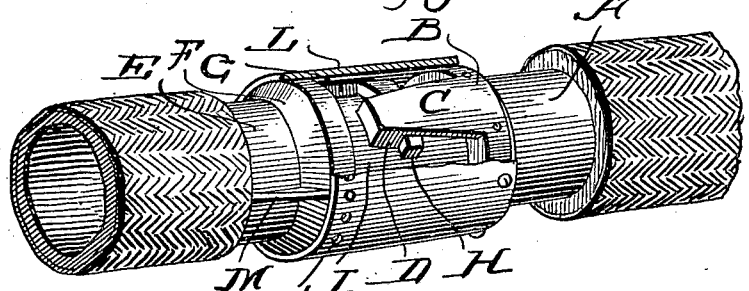
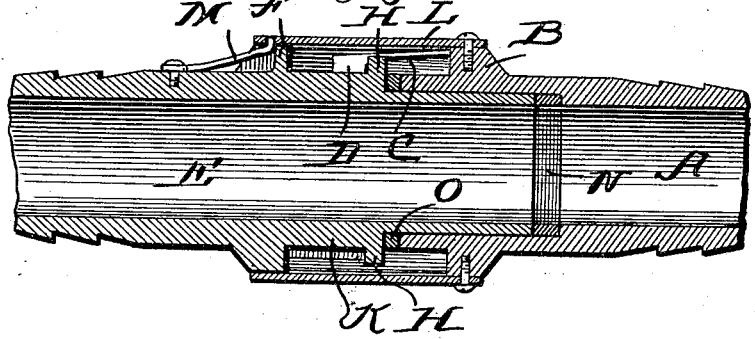
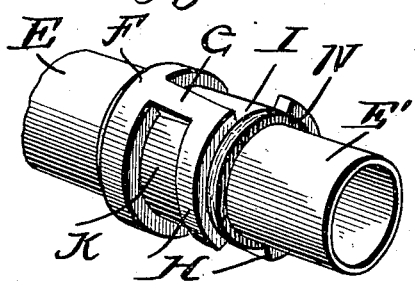
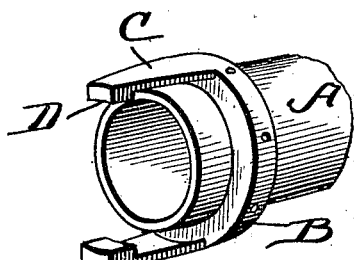
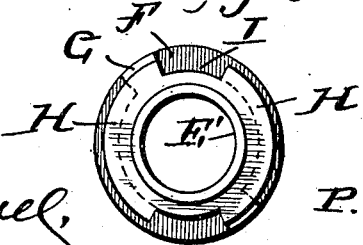
WITNESSES:
INVENTOR
P. J. A. Schnoor.
BY
O'Meara & Brock
ATTORNEYS

UNITED STATES PATENT OFFICE.

PETER J. A. SCHNOOR, OF HOLSTEIN, IOWA.

PIPE-COUPLING.

No. 825,354.

Specification of Letters Patent.

Patented July 10, 1906.

Application filed April 18, 1905. Serial No. 256,243.

*To all whom it may concern:*

Be it known that I, PETER J. A. SCHNOOR, a citizen of the United States, residing at Holstein, in the county of Ida and State of Iowa, have invented a new and useful Pipe-Coupling, of which the following is a specification.

My invention relates to hose-couplings, and has for its object to provide a coupling that is very simple in construction and one that can be put together or taken apart without the use of a wrench and with ease.

The object of my invention is to provide a hose-coupling that will form a perfect water-tight joint when the sections are united, with means for locking the parts together, so that all danger of the parts coming apart is prevented.

The invention also consists in the combination and construction of parts, which will hereinafter be fully described, and pointed out in the claims.

In the drawings forming a part of this specification, Figure 1 is a perspective view of the coupling with the casing partly broken away. Fig. 2 is a longitudinal sectional view of the coupling. Fig. 3 is a perspective view of the male sections detached. Fig. 4 is a perspective view of the female section detached. Fig. 5 is an end view of the male section.

Referring to the drawings, A designates the female section of the coupling, which is formed with a circular collar B, provided with arms C, having inwardly-projecting lugs D, formed on their ends. The male section E is formed with spirally-arranged grooves K, formed on the exterior surface of the section by the circular collar F, having outwardly-extending ribs G, each of the ribs having a circular wedge-shaped rib H, extending partly around the section, having an opening I, adapted to receive the lugs D on the arms C. A washer O is placed up against the ribs H and is engaged by the end of the female section A when coupled, forming a water-tight joint.

To the collar D of the female section A is secured a tubular casing L, which completely incloses the sections when coupled and prevents any dirt or dust from lodging on the parts. The free end of the casing L is provided with a series of perforations L', which are engaged by a spring-pawl M, carried by the male section, and prevents the parts from turning.

In coupling the sections the ends D of the arms C of the female section will enter the openings I of the grooves K of the male section, and by turning the sections in opposite directions to each other the lugs D will be forced to follow the spirally-arranged grooves, and thereby the sections will be drawn tightly together and locked by the spring-pawl M, which engages the perforations in the casing and prevents the parts from turning.

Having thus fully described my invention, what I claim as new, and desire to secure by Letters Patent, is —

1. In a pipe-coupling, the combination with a female section, composed of a neck having a collar provided with outwardly-projecting arms having inwardly-projecting lugs, a casing provided with perforations at one end secured to said collar, of a male section composed of a neck provided with a circular collar having outwardly-extending ribs provided with wedge-shaped ribs extending partly around the neck, and a spring-pawl arranged in a recess in the collar of the male section and adapted to engage the spring in the casing, for the purpose described.

2. In a hose-coupling, the combination with a female section, composed of a neck having a collar, an arm provided with lugs projecting from said collar, a casing provided with perforations secured to said collar, of a male section composed of a neck provided with sprially-arranged grooves formed by a collar and circular ribs arranged thereon, and a spring-pawl carried by the male section and engaging the perforation in the casing as set forth.

3. In a pipe-coupling, the combination with a female section, composed of a neck having a collar provided with arms having inwardly-projecting lugs, of a male section, composed of a neck adapted to fit below the neck and arms of the female section and engaging said collar, a collar arranged on the female section, circular ribs arranged adjacent said collar and means for locking the sections after united, for the purpose described.

4. A pipe-coupling comprising two coacting sections, one of said sections carrying arms projecting in advance of said section, a casing secured to the section carrying the arms, projecting in advance of said arms, and provided with spaced openings, the other section being provided with spirally-arranged grooves provided with side openings adapted to admit the end portion of the arms of the other section, and a spring-pawl carried by the section with the grooves and adapted to fit in the opening in the sleeve for locking the said sections against rotation, with respect to each other.

PETER J. A. SCHNOOR.

Witnesses:
 R. P. WHEATLEY,
 ALBERT G. OERTLEY, Jr.